(12) United States Patent
Oh et al.

(10) Patent No.: US 8,778,077 B2
(45) Date of Patent: Jul. 15, 2014

(54) SOLVENT FOR HEAT-SHRINKABLE POLYESTER-BASED LABELS

(75) Inventors: Taebyoung Oh, Suwon-si (KR); Tae Houng Jeong, Covington, GA (US)

(73) Assignees: SKC Inc., Covington, GA (US); SKC Co., Ltd, Suwon Si (KR)

( * ) Notice: Subject to any disclaimer, the term of this patent is extended or adjusted under 35 U.S.C. 154(b) by 0 days.

(21) Appl. No.: 13/408,525

(22) Filed: Feb. 29, 2012

(65) Prior Publication Data

US 2013/0220179 A1    Aug. 29, 2013

(51) Int. Cl.

| | |
|---|---|
| *C08J 7/02* | (2006.01) |
| *C09J 5/06* | (2006.01) |
| *C09J 11/06* | (2006.01) |
| *C08J 5/12* | (2006.01) |
| *B29C 61/02* | (2006.01) |
| *B29C 61/06* | (2006.01) |
| *B29C 65/02* | (2006.01) |
| *B29C 65/48* | (2006.01) |
| *B32B 27/06* | (2006.01) |
| *C08K 5/1535* | (2006.01) |
| *C08K 5/1565* | (2006.01) |
| *C08K 5/06* | (2006.01) |
| *C08K 5/00* | (2006.01) |
| *G09F 3/08* | (2006.01) |
| *G09F 3/10* | (2006.01) |
| *B29K 67/00* | (2006.01) |

(52) U.S. Cl.
CPC .................. *C08J 5/122* (2013.01); *B29C 61/02* (2013.01); *B29C 61/06* (2013.01); *B29C 65/02* (2013.01); *B29C 65/4895* (2013.01); *B32B 27/06* (2013.01); *C08J 7/02* (2013.01); *C08K 5/1535* (2013.01); *C08K 5/1565* (2013.01); *C08K 5/06* (2013.01); *C08K 5/005* (2013.01); *G09F 3/08* (2013.01); *G09F 3/10* (2013.01); *B32B 2307/736* (2013.01); *B29K 2067/00* (2013.01)
USPC ............... 106/311; 252/365; 156/84; 156/85; 156/86; 156/217; 156/218; 156/305; 156/308.6; 156/308.8

(58) Field of Classification Search
CPC ...... B29C 61/003; B29C 61/02; B29C 61/06; B29C 61/10; B29C 65/02; B29C 65/4895; B29C 66/7371; B29K 2067/00; B32B 2307/736; B32B 27/06; C08J 5/122; C08J 7/02; C08K 5/1515; C08K 5/1565; C08K 5/06; C08K 5/005; C08K 13/00; C09D 7/00; C09J 5/06; C09J 7/02; C09J 11/06; C09K 3/00; G09F 3/08; G09F 3/10
USPC ......... 106/311; 252/365; 156/84, 85, 86, 217, 156/218, 305, 308.6, 308.8
See application file for complete search history.

(56) References Cited

U.S. PATENT DOCUMENTS

| | | | | |
|---|---|---|---|---|
| 3,947,289 | A * | 3/1976 | Dey et al. ...................... | 429/330 |
| 5,994,282 | A * | 11/1999 | Lallier ........................... | 510/203 |
| 6,342,281 | B2 * | 1/2002 | Hayakawa et al. ........... | 428/35.2 |
| 6,365,565 | B1 * | 4/2002 | Thenappan et al. .......... | 510/411 |
| 6,720,085 | B2 * | 4/2004 | Ito et al. ........................ | 428/480 |
| 7,001,651 | B2 * | 2/2006 | Hayakawa et al. ........... | 428/34.9 |
| 7,279,204 | B2 * | 10/2007 | Ito et al. ........................ | 428/34.9 |
| 7,303,812 | B2 * | 12/2007 | Hashimoto et al. .......... | 428/318.6 |
| 7,344,765 | B2 * | 3/2008 | Hayakawa et al. ........... | 428/34.9 |
| 7,390,099 | B2 * | 6/2008 | Takao et al. ................... | 359/601 |
| 7,638,203 | B2 * | 12/2009 | Inagaki et al. ................ | 428/480 |
| 7,727,620 | B2 * | 6/2010 | Yamada et al. ............... | 428/212 |
| 7,939,174 | B2 * | 5/2011 | Hayakawa et al. ........... | 428/480 |
| 8,202,941 | B2 * | 6/2012 | Keung et al. .................. | 525/191 |
| 8,383,246 | B2 * | 2/2013 | Frauenhofer et al. ......... | 428/515 |
| 8,486,515 | B2 * | 7/2013 | Ishida et al. .................. | 428/195.1 |
| 2009/0130567 | A1 * | 5/2009 | Segawa .......................... | 429/335 |
| 2011/0117407 | A1 * | 5/2011 | Huang ............................ | 429/94 |
| 2011/0311886 | A1 * | 12/2011 | Funada et al. ................. | 429/338 |

FOREIGN PATENT DOCUMENTS

| | | | |
|---|---|---|---|
| DE | 19526351 | A1 * | 1/1997 |
| JP | 2011158671 | A * | 8/2011 |

* cited by examiner

*Primary Examiner* — Anthony J Green
(74) *Attorney, Agent, or Firm* — Sughrue Mion, PLLC

(57) ABSTRACT

A solvent comprising 40 to 100 wt % of 1,3-dioxolane and 0 to 60 wt % of tetrahydrofuran, wherein the solvent further comprises 30 ppm to 800 ppm of an antioxidant, based on the total weight of the solvent, provides a long shelf life with good adhesive strength even after exposure to air. The solvent can be effectively used for labeling of heat-shrinkable polyester-based labels.

4 Claims, No Drawings

SOLVENT FOR HEAT-SHRINKABLE POLYESTER-BASED LABELS

FIELD OF THE INVENTION

The present invention relates to a solvent for heat-shrinkable polyester-based labels.

BACKGROUND OF THE INVENTION

Heat-shrinkable polyester-based films have been widely used for packaging and labeling of beverage containers (e.g., PET bottles) and other types of containers due to their heat-shrinkable characteristics. Conventionally, in order to label an ordinary beverage container with a cylindrical shape, a polyester-based film is cut into certain sizes and rolled into a cylindrical form. After both ends of the film are glued with an adhesive solvent, the cylindrical film is put around the container and then shrunk. For performing effective labeling, not only the characteristics of the heat-shrinkable polyester-based film are of great importance but also the characteristics of the adhesive solvent.

Conventionally, such solvents as chloroform, 1-methyl-2-pyrrolidinone, tetrahydrofuran (THF), and 1,3-dioxolane have been widely used as adhesive solvents for heat-shrinkable polyester-based labels. However, the use of chloroform is restricted because of its carcinogenicity; and 1-methyl-2-pyrrolidinone is not preferred due to its strong and unpleasant odor. Hence, THF and 1,3-dioxolane have been used singly or as a mixture thereof. However, as THF and 1,3-dioxolane are prone to oxidation to form peroxides, a long-term storage after exposure to air may lead to a decrease in their solubility, which would eventually bring about defects in the adhesion of the labels. As a result, heat-shrinkable film manufacturers have always had to use fresh solvents to secure consistent adhesive strength, suffering difficulties in the storage of solvents.

Therefore, it is necessary to develop a novel solvent for heat-shrinkable polyester-based labels, which has a long shelf life with consistent adhesive strength and excellent storage stability.

SUMMARY OF THE INVENTION

It is an object of the present invention to provide a novel solvent for heat-shrinkable polyester-based labels, which has a long shelf life with excellent storage stability.

In accordance with one aspect of the present invention, there is provided a solvent for heat-shrinkable polyester-based labels comprising 40 to 100 wt % of 1,3-dioxolane and 0 to 60 wt % of tetrahydrofuran, wherein the solvent further comprises 30 ppm to 800 ppm of an antioxidant, based on the total weight of the solvent.

The solvent for heat-shrinkable polyester-based labels according to the present invention is useful in labeling since it has a long shelf life with consistent adhesive strength even after exposure to air.

DETAILED DESCRIPTION OF THE INVENTION

The present invention provide a solvent for heat-shrinkable polyester-based labels comprising 40 to 100 wt % of 1,3-dioxolane and 0 to 60 wt % of tetrahydrofuran, wherein the solvent further comprises 30 ppm to 800 ppm of an antioxidant, based on the total weight of the solvent.

The solvent of the present invention is applied to the side ends of the heat-shrinkable polyester-based film. Then, the side ends are glued to each other to form a label. The solvent is characterized by a long shelf life with consistent adhesive strength even after exposure to air.

The technical effects of the solvent of the present invention are produced by the composition of the solvent and the employment of an antioxidant in a specific amount. Hereinafter, the features of the present invention are described in detail in terms of the components constituting the solvent and their contents.

(1) Solvent Components

Employed in the solvent of the present invention are 1,3-dioxolane and tetrahydrofuran, which are well known in the art, in amounts of 40 to 100 wt % and 0 to 60 wt %, respectively. In case the content of each component is out of the range mentioned above, the adhesive strength would decrease. In one embodiment of the present invention, 60 to 70 wt % of 1,3-dioxolane and 30 to 40 wt % of tetrahydrofuran may be used for optimum adhesive strength.

(2) Antioxidant

In one embodiment of the present invention, the solvent comprises an antioxidant for preventing deterioration of solubility upon long-term storage of the solvent. The antioxidant added to the solvent of the present invention plays a role in preventing oxidation of said solvent components, which leads to the formation of a peroxide. Examples of the antioxidant that can be used in the present invention include, but are not limited to, di-t-butyl-hydroxy-toluene (BHT), triethylamine (TEA), pentaerythritol tetrakis (e.g., IRGANOX® 1010), or any other typical antioxidants known in the art. The antioxidant of the present invention may be used in an amount ranging from 30 ppm to 800 ppm, based on the total weight of the solvent. If the amount is less than 30 ppm, the adhesive strength of the solvent would deteriorate upon long-term storage. On the other hand, if the amount is greater than 800 ppm, the solvent would produce the same results as that having an amount of the antioxidant between 30 ppm to 800 at a higher cost. In one embodiment of the present invention, the antioxidant may be used in an amount of 30 ppm to 150 ppm, based on the total weight of the solvent.

The present invention is further described in Examples; the following Examples, however, are given for the purpose of illustration only and are not intended to limit the scope of the invention.

EXAMPLE 1

Preparation of a Solvent of the Present Invention

A solvent was prepared that comprises 70 wt % 1,3-dioxolane (1,3-DXL) and 30 wt % tetrahydrofuran (THF) as its components, which further comprised 75 ppm (based on the total weight of the solvent) of di-t-butyl-hydroxyl-toluene (BHT) as an antioxidant.

Specifically, 70 wt % of 1,3-DXL and 30 wt % of THF were weighed and mixed together, and the mixture thereof was stirred for 5 minutes. Then, 75 ppm of BHT as an antioxidant, based on the total weight of the said solvent, was added thereto, and the mixture was stirred for 5 minutes.

EXAMPLE 2

Preparation of a Solvent of the Present Invention

A solvent was prepared by repeating Example 1, except for employing 60 wt % of 1,3-DXL 60 and 40 wt % of THF, and 100 ppm of TEA as an antioxidant.

EXAMPLE 3

Preparation of a Solvent of the Present Invention

A solvent was prepared by repeating Example 1, except for employing 100 ppm of IRGANOX® 1010 (DuPont Inc.) as an antioxidant.

EXAMPLE 4

Preparation of a Solvent of the Present Invention

A solvent was prepared by repeating Example 1, except for employing 100 wt % of 1,3-DXL and no THF, and 600 ppm of BHT.

EXAMPLE 5

Preparation of a Solvent of the Present Invention

A solvent was prepared by repeating Example 1, except for employing 90 wt % of 1,3-DXL and 10 wt % THF, and 800 ppm of TEA.

EXAMPLE 6

Preparation of a Solvent of the Present Invention

A solvent was prepared by repeating Example 1, except for employing 40 wt % of 1,3-DXL and 60 wt % THF, and 150 ppm of BHT.

COMPARATIVE EXAMPLE 1

Preparation of a Comparative Solvent

A solvent was prepared by repeating Example 1, except that no antioxidant was employed.

COMPARATIVE EXAMPLE 2

Preparation of a Comparative Solvent

A solvent was prepared by repeating Example 1, except for employing 20 ppm of BHT as an antioxidant.

COMPARATIVE EXAMPLE 3

Preparation of a Comparative Solvent

A solvent was prepared by repeating Example 1, except for employing 30 wt % of 1,3-DXL and 70 wt % of THF, and 100 ppm of BHT as an antioxidant.

The compositions of the solvents of Examples 1 to 6 and Comparative Examples 1 to 3 are summarized in the Table 1 below.

TABLE 1

| | 1,3-DXL | THF | ANTIOXIDANT | CONC. OF ANTIOXIDANT |
|---|---|---|---|---|
| Ex. 1 | 70% | 30% | BHT | 75 ppm |
| Ex. 2 | 60% | 40% | TEA | 100 ppm |
| Ex. 3 | 70% | 30% | IRGANOX ® 1010 | 100 ppm |
| Ex. 4 | 100% | 0% | BHT | 600 ppm |
| Ex. 5 | 90% | 10% | TEA | 800 ppm |
| Ex. 6 | 40% | 60% | BHT | 150 ppm |
| Comp. Ex. 1 | 70% | 30% | NONE | N/A |
| Comp. Ex. 2 | 70% | 30% | BHT | 20 ppm |
| Comp. Ex. 3 | 30% | 70% | BHT | 100 ppm |

TEST EXAMPLE

Comparison of Adhesive Strength

The solvents prepared in Examples 1 to 6 and Comparative Examples 1 to 3 were tested for measuring their adhesive strength according to the following procedures.

Specifically, 10 μL of each of the prepared solvents were dropped on a surface of a heat-shrinkable film, and said film was covered with another heat-shrinkable film. Both films were uniformly pressed by a roller to adhere together. The glued films were trimmed to have a width of 15 mm, and their adhesive strength tests were performed and measured using a peel tester (AR-1000, Cheminstruments Inc.) until the films were separated. The results are shown in Table 2.

TABLE 2

| Adhesive Strength (mN/15 mm) | | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Elapsed Time after Exposure to Air | IMM | 530 | 480 | 530 | 580 | 560 | 440 | 530 | 530 | 150 |
| | 5 days | 530 | 480 | 530 | 580 | 560 | 440 | 510 | 510 | 130 |
| | 10 days | 520 | 470 | 530 | 580 | 560 | 430 | 400 | 410 | N/A |
| | 15 days | 520 | 450 | 530 | 576 | 560 | 430 | 350 | 380 | N/A |
| | 20 days | 510 | 430 | 530 | 574 | 556 | 410 | 280 | 300 | N/A |
| | 30 days | 500 | 410 | 510 | 574 | 556 | 400 | 180 | 250 | N/A |

(IMM: immediately; N/A: non-adhesive; Adhesive strength above 300 mN/15 mm: good, below 300 mN/15 mm: defective)

As shown in table 2, the solvents according to the present invention (Examples 1 to 6), which comprise 40 to 100 wt % of 1,3-dioxolane and 0 to 60 wt % of tetrahydrofuran, and 30 ppm to 800 ppm of an antioxidant, based on the total weight of the solvent, exhibited good adhesion strength above 300 nN/15 mm even after exposure to air for 30 days.

However, the solvent without any antioxidant (Comparative Example 1) or the solvent with 20 ppm of an antioxidant (Comparative Example 2) suffered deterioration of adhesive strength as time passed. Also, the solvent with 30 wt % of 1,3-dioxolane and 70 wt % of tetrahydrofuran, even though it contained 100 ppm of an antioxidant, showed very poor adhesive strength.

The results indicate that the amounts of 1,3-dioxolane and tetrahydrofuran as well as the employment of antioxidants and its amounts are critical for the storage stability of solvents for heat-shrinkable polyester-based labels.

What is claimed is:

1. A solvent for heat-shrinkable polyester-based labels, said solvent consisting of 60 to 70 wt % of 1,3-dioxolane, 30 to 40 wt % of tetrahydrofuran, and 30 ppm to 800 ppm of an antioxidant, based on the total weight of the solvent.

2. The solvent for heat-shrinkable polyester-based label of claim 1, wherein the amount of the antioxidant is 30 ppm to 150 ppm, based on the total weight of the solvent.

3. The solvent for heat-shrinkable polyester-based label of claim 1, wherein the antioxidant is di-t-butyl-hydroxyl-toluene, triethylamine, or pentaerythritol tetrakis.

4. A method for forming a heat-shrinkable polyester-based label on a surface of a container, comprising
   applying the solvent of claim 1 to one end of a heat-shrinkable polyester film;
   adhering the end where the solvent is applied to another end of the heat-shrinkable polyester film to form a cylindrical form;
   placing the heat-shrinkable polyester film in a cylindrical form around the surface of the container; and
   applying heat to the heat-shrinkable polyester film.

* * * * *